United States Patent
Taylor et al.

(10) Patent No.: US 10,817,153 B2
(45) Date of Patent: Oct. 27, 2020

(54) AUGMENTED AUDIO DEVELOPMENT

(71) Applicant: Bose Corporation, Framingham, MA (US)

(72) Inventors: Charles Reuben Taylor, Milford, CT (US); Utsav Prakash Shah, Shrewsbury, MA (US); Vijayan P. Sarathy, Littleton, MA (US); Gabriel Quinn Butterick, Waltham, MA (US); Arthur Allen Gibson, Sudbury, MA (US); Jeffrey Hunter, West Orange, NJ (US); Jaime Abramson, Watertown, MA (US); Daniel Rosenblatt, Natick, MA (US); Yehonatan Meschede-Krasa, Somerville, MA (US)

(73) Assignee: Bose Corporation, Framingham, MA (US)

( * ) Notice: Subject to any disclaimer, the term of this patent is extended or adjusted under 35 U.S.C. 154(b) by 83 days.

(21) Appl. No.: 16/289,932

(22) Filed: Mar. 1, 2019

(65) Prior Publication Data

US 2020/0278784 A1    Sep. 3, 2020

(51) Int. Cl.
G06F 3/0484    (2013.01)
G06F 3/16    (2006.01)
G06F 3/0482    (2013.01)

(52) U.S. Cl.
CPC ...... *G06F 3/04842* (2013.01); *G06F 3/04847* (2013.01); *G06F 3/162* (2013.01); *G06F 3/167* (2013.01); *G06F 3/0482* (2013.01)

(58) Field of Classification Search
CPC ...... G06F 3/04842; G06F 3/162; G06F 3/167; G06F 3/0482
See application file for complete search history.

(56) References Cited

U.S. PATENT DOCUMENTS

| 7,631,277 | B1 | 12/2009 | Nie et al. |
| 10,031,655 | B2 | 7/2018 | Kim et al. |
| 2009/0015583 | A1 | 1/2009 | Starr et al. |
| 2009/0113305 | A1* | 4/2009 | Graif ............... G09B 29/008 715/727 |
| 2009/0228779 | A1 | 9/2009 | Willianson et al. |
| 2009/0276730 | A1 | 11/2009 | Aybes et al. |
| 2009/0300679 | A1 | 12/2009 | Hiroi et al. |
| 2011/0107227 | A1 | 5/2011 | Rempell et al. |
| 2014/0155154 | A1 | 6/2014 | Laakkonen et al. |

(Continued)

OTHER PUBLICATIONS

Salo et al., "Backend Infrastructure Supporting Audio Augmented Reality and Storytelling" (Jun. 21, 2016), International Conference on Human Interface and the Management of Information, pp. 325-335 [retrieved from https://link.springer.com/chapter/10.1007/978-3-319-40397-7_31].*

(Continued)

*Primary Examiner* — Brian W Wathen
(74) *Attorney, Agent, or Firm* — Hoffman Warnick LLC (57) ABSTRACT

Various implementations include computing devices and related computer-implemented methods for rendering a scene in an augmented audio environment. Certain implementations include approaches for generating application programming interface (API) inputs on a display. Additional implementations include approaches for rendering the API inputs at an audio device.

24 Claims, 7 Drawing Sheets

(56) References Cited

U.S. PATENT DOCUMENTS

| | | | |
|---|---|---|---|
| 2015/0100623 A1 | 4/2015 | Gudell et al. | |
| 2015/0133168 A1* | 5/2015 | Jay | H04W 4/029 455/456.3 |
| 2015/0229696 A1 | 8/2015 | Kim et al. | |
| 2018/0173388 A1* | 6/2018 | Holmes | G06F 16/686 |
| 2018/0206069 A1* | 7/2018 | Santos | H04W 4/021 |
| 2018/0349700 A1* | 12/2018 | Percuoco | G06Q 10/06 |
| 2019/0124401 A1* | 4/2019 | Lentner | H04N 21/485 |
| 2019/0139314 A1* | 5/2019 | Marsh | A63F 13/00 |
| 2019/0243530 A1* | 8/2019 | De Ridder | G06F 3/04817 |
| 2020/0111242 A1* | 4/2020 | Gupta | G06F 40/284 |
| 2020/0209952 A1* | 7/2020 | Jarvinen | G06F 3/011 |

OTHER PUBLICATIONS

Tsuruoka et al., "An Authoring Tool for Urban Audio Tours with Animated Maps" (Dec. 2008), ACE '08: Proceedings of the 2008 International Conference on Advances in Computer Entertainment Technology, pp. 330-333 [retrieved from https://dl.acm.org/doi/abs/10.1145/1501750.1501828].*

Walker et al., "Mobile Audio Designs Monkey: An Audio Augmented Reality Designer's Tool" (Jul. 6-9, 2005), Proceedings of ICAD 05-Eleventh Meeting of the International Conference on Auditory Display, pp. 1-5 [ retrieved from https://pdfs.semanticscholar.org/db13/049a3fb192f21a876dd1544bdbe7cfc2d277.pdf].*

* cited by examiner

AUGMENTED AUDIO DEVELOPMENT

TECHNICAL FIELD

This disclosure generally relates to augmented reality (AR) audio experiences. More particularly, the disclosure relates to devices and related methods for rendering AR audio experiences in audio devices, such as wearable audio devices.

BACKGROUND

Portable electronic devices, including headphones, audio eyeglasses and other wearable audio systems are becoming more commonplace. These portable electronic devices can enable more immersive user experiences, for example, using audio to augment the user's perception of the surrounding world. However, these conventional systems fail to capitalize on the various benefits that augmented audio can provide.

SUMMARY

All examples and features mentioned below can be combined in any technically possible way.

Various implementations include computing devices and related computer-implemented methods for rendering a scene in an augmented audio environment. Certain implementations include approaches for generating application programming interface (API) inputs on a display. Additional implementations include approaches for rendering the API inputs at an audio device.

In some particular aspects, a computing device for rendering a scene in an augmented audio environment includes: a display; a processor to execute instructions; and a memory coupled with the processor to store the instructions, which when executed by the processor, cause the processor to perform operations to generate a set of inputs to an application programming interface (API) on the display, the set of inputs including: a narrative audio file selection input; and an interactive audio file selection input, where the scene is rendered based upon the set of inputs in response to user actuation at an audio device.

In other particular aspects, a computer-implemented method includes: generating a set of inputs to an application programming interface (API) on a display, the set of inputs including: a narrative audio file selection input; and an interactive audio file selection input; and rendering the set of inputs at an audio device to generate an augmented audio environment.

In additional particular aspects, a computer-implemented method includes: generating a set of inputs to an application programming interface (API) on a display, the set of inputs including: an interactive audio file selection input comprising a plurality of interactive audio file selection sub-inputs; and a location selection input; and generating an augmented audio environment by rendering at least one of the sub-inputs at an audio device in response to the audio device being in proximity to a location corresponding with the location selection input, where at least one of the sub-inputs is selected based upon an orientation of a user of the audio device relative to the location.

Implementations may include one of the following features, or any combination thereof.

In some cases, the API allows an API-calling component to perform the following operations in response to the user actuation at the audio device: render, at the audio device, playback of a narrative audio file from the narrative audio file selection input; and render, at the audio device, playback of an interactive audio file from the interactive audio file selection input after rendering the narrative audio file.

In particular aspects, the set of inputs further includes a location selection input, and the narrative audio file is rendered in response to the user actuation while the audio device is in proximity to a location corresponding with the location selection input.

In certain implementations, the narrative audio file includes a prompt to initiate playback of the interactive audio file, and the API-calling component renders playback of the interactive audio file only in response to user actuation of the prompt to initiate playback of the interactive audio file.

In some cases, the narrative audio file selection input enables a programmer to assign a narrative audio file for describing the scene in the augmented audio environment.

In particular aspects, the interactive audio file selection input enables a programmer to assign an interactive audio file for playback following the narrative audio file.

In some implementations, at least one of the narrative audio file or the interactive audio file comprises a spatialized audio file configured for binaural playback, a monaural audio file, a stereo audio file, or a multichannel audio file.

In certain aspects, the interactive audio file selection input includes a plurality of interactive audio file selection sub-inputs for rendering playback based upon an orientation of a user of the audio device.

In particular cases, the orientation of the user is determined based upon a look direction of the user while wearing the audio device.

In some implementations, the instructions cause the processor to further generate an additional set of inputs for rendering an additional scene in the augmented audio environment, the additional set of inputs including: an additional narrative audio file selection input; and an additional interactive audio file selection input, where the additional scene is rendered based upon the additional set of inputs in response to user actuation at the audio device.

In certain aspects, the set of inputs further includes a radius selection input for defining a radius around a location corresponding with the location selection input.

In some cases, the set of inputs further includes an actuation trigger selection input for defining an actuation mechanism to initiate rendering of the scene in the augmented audio environment.

In particular implementations, generating an augmented audio environment by rendering at least one of the sub-inputs at an audio device is in response to both: (i) the audio device being in proximity to a location corresponding with the location selection input and (ii) user actuation at the audio device.

In certain aspects, the set of inputs further includes a narrative audio file selection input, and generating the augmented audio environment further includes rendering a narrative audio file from the narrative audio file selection input at the audio device in response to the audio device being in proximity to the location corresponding with the location selection input, prior to rendering the at least one of the sub-inputs.

Two or more features described in this disclosure, including those described in this summary section, may be combined to form implementations not specifically described herein.

The details of one or more implementations are set forth in the accompanying drawings and the description below.

Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a scene in an augmented audio environment can be rendered based upon application programming interface (API) inputs, e.g., from a developer. Certain implementations include approaches for generating application programming interface (API) inputs on a display. Additional implementations include approaches for rendering the API inputs at an audio device.

Commonly labeled components in the FIGURES are considered to be substantially equivalent components for the purposes of illustration, and redundant discussion of those components is omitted for clarity.

Figure 1:
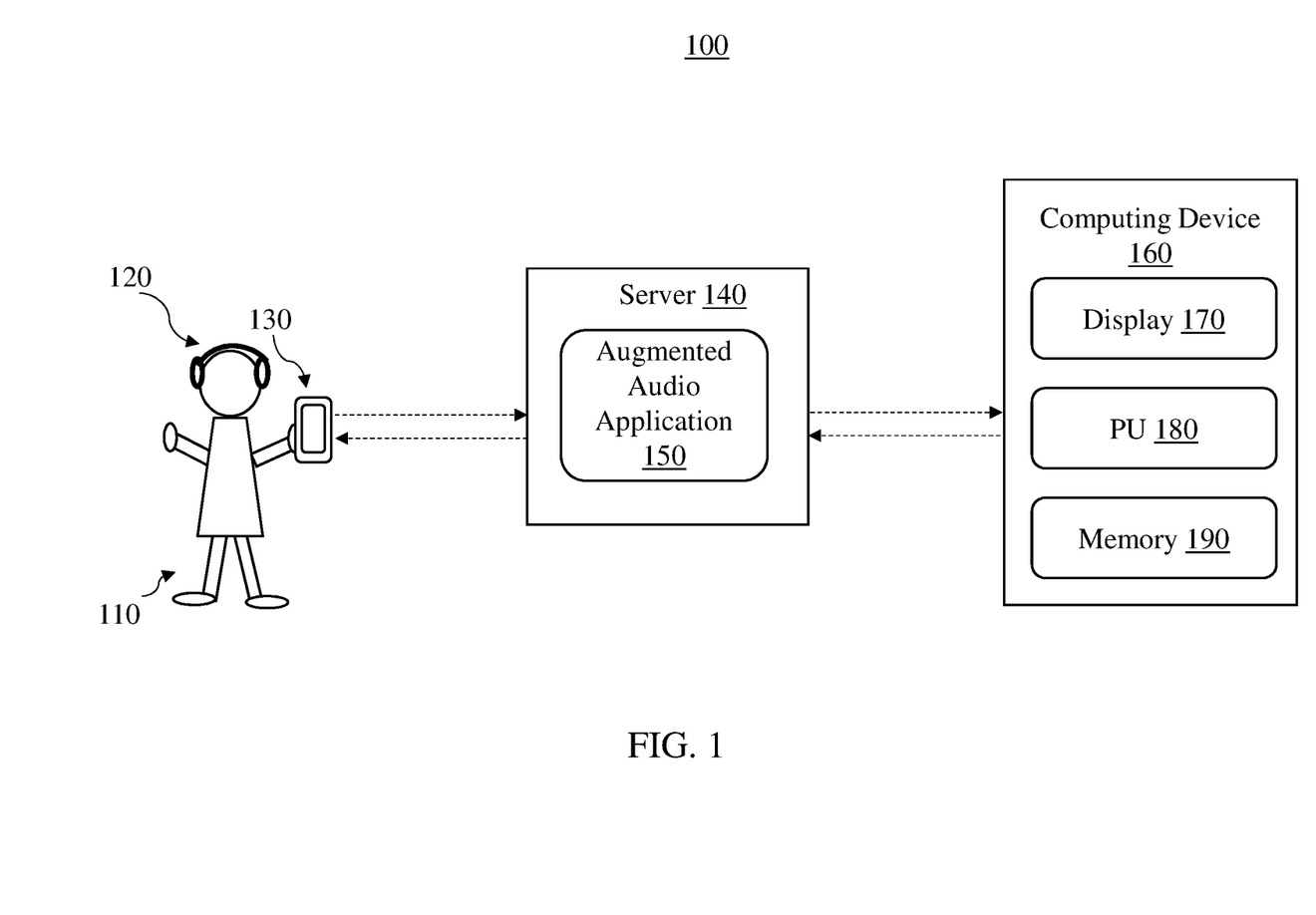
FIG. 1 is a data flow diagram illustrating interaction between devices in an environment according to various implementations.

Various implementations include a computing device for rendering a scene in an augmented audio environment. FIG. 1 illustrates an example environment 100, including a user 110 and an audio device 120. While the audio device 120 is illustrated in this example as a wearable audio device (e.g., headphones, earphones, audio glasses, open-ear audio devices, shoulder-worn speakers or wearable speakers), the audio device 120 can include any conventional audio device such as a portable speaker, smart speaker, etc. In some implementations, the audio device 120 is connected with a smart device 130. However, in other implementations, the audio device 120 can have integrated smart device capabilities (e.g., communications and data processing), such that a distinct smart device 130 is not necessary to perform functions described herein.

In particular cases, the smart device 130 includes a smart phone, smart watch or other wearable smart device, portable computing device, etc., and has an audio gateway, processing components, and one or more wireless transceivers for communicating with other devices in the environment 100. For example, the wireless transceiver(s) can be used to communicate with the audio device 120, as well as one or more connected smart devices within communications range. The wireless transceivers can also be used to communicate with a server 140 hosting a mobile application that is running on the smart device 130, for example, an augmented audio application 150. The server 140 can include a cloud-based server, a local server or any combination of local and distributed computing components capable of executing functions described herein. In various particular implementations, the server 140 is a cloud-based server configured to host the augmented audio application 150, e.g., running on the smart device 130. According to some implementations, the augmented audio application 150 is downloaded to the user's smart device 130 in order to enable functions described herein.

In certain cases, the server 140 is connected with a computing device 160 that enables coding of the augmented audio application 150, e.g., by a software developer or other programmer. In some example implementations, the computing device 160 is the same device as the smart device 130, and/or is an integral device within the smart device 130. In other example implementations, the computing device 160 is a device that is distinct from the smart device 130. In additional example implementations, the computing device 160 can include a cloud-based computing system that is accessible via a smart device (e.g., smart device 130) or other local computing device, e.g., via a web browser. In various implementations, the computing device 160 includes a display 170. In certain implementations, the display 170 includes a user interface such as a touch screen, graphical user interface or other visual interface. In cases where the computing device 160 is a smart device such as a smart-phone or tablet, the display 170 includes the screen on that smart device. In other cases, the computing device 160 can include a PC, a smart television, a surface computing machine, etc., and the display 170 can be a separate physical device such as a monitor or projection screen. The computing device 160 can also include a processor (PU) 180 to execute instructions for generating a set of inputs to an application programming interface (API) on the display 170. In some cases, a memory 190 is coupled with the processor (PU) 180 to store the instructions. In other implementations, the processor 180 can otherwise access the instructions, e.g., from a remote storage system connected with the computing device 160. When executed by the processor 180, the instructions cause the processor 180 to generate a set of inputs to the API, as shown on the display 170.

The memory 190 can include, for example, flash memory and/or non-volatile random access memory (NVRAM). In some implementations, instructions (e.g., software) are stored in an information carrier. The instructions, when executed by one or more processing devices (e.g., the processor 180), perform one or more processes, such as those described elsewhere herein. The instructions can also be stored by one or more storage devices, such as one or more (e.g. non-transitory) computer- or machine-readable mediums (for example, the memory, or memory on the processor). As described herein, the memory 190 can include instructions, or the processor 180 can otherwise access instructions for generating API inputs on a display (for an augmented audio environment) according to various particular implementations. It is understood that portions of the memory (e.g., instructions) could also be stored in a remote location or in a distributed location, and could be fetched or otherwise obtained by the processor 180 (e.g., via any communications protocol described herein) for execution.

Figure 2:
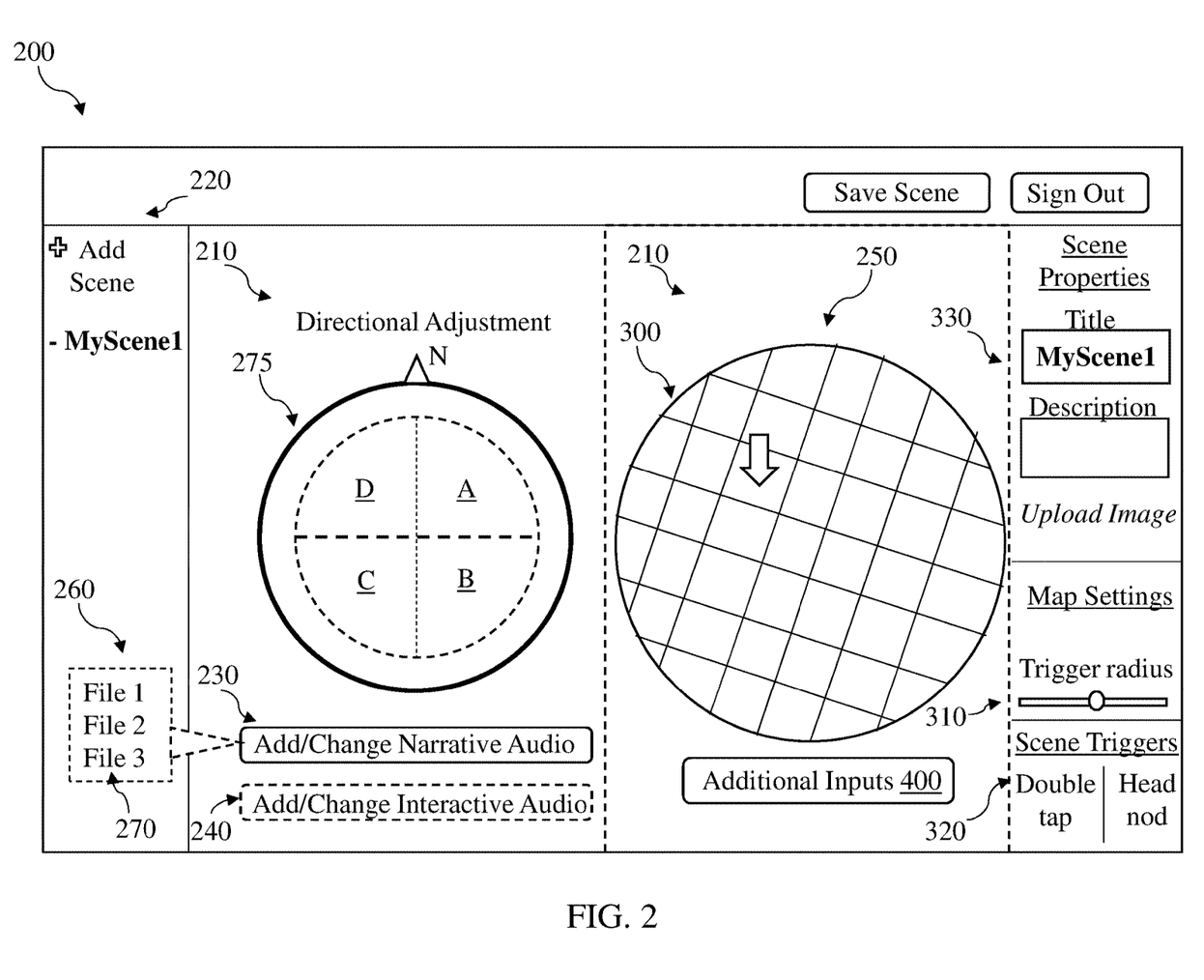
FIG. 2 is a schematic depiction of an example interface for providing inputs to an API according to various implementations.

FIG. 2 is a schematic depiction of an example interface (e.g., graphical user interface) 200 displaying inputs 210 to an API for rendering a scene in an augmented audio environment. According to various implementations, the interface 200 is rendered at the display 170 (FIG. 1), and provides the programmer (or, software developer) with inputs 210 used by the API to render a scene in an augmented audio environment. In particular cases, the API uses the inputs 210 to render audio playback at the audio device 120 worn by the user 110 (FIG. 1).

The programmer can create a scene by clicking or otherwise actuating an option on a scene selection menu 220. In certain cases, the scene selection menu 220 allows the programmer to add scenes and/or switch between scenes for editing. In some implementations, scenes are assigned ownership rights, or are editable only by select programmers, and as such, are not available for editing by all programmers. In additional implementations, scenes can be edited by multiple programmers.

After selecting a scene from the scene selection menu 220, the programmer can add and/or edit inputs 210 to the API. In some cases, inputs 210 can include: a narrative audio file selection input 230, and an interactive audio file selection input 240. In some additional implementations, the inputs 210 further include a location selection input 250 (illustrated in phantom area as optional).

In various implementations, the narrative audio file selection input 230 enables a programmer to assign a narrative audio file (or audio stream) for describing the scene or an interactive audio file in the scene in the augmented audio environment. FIG. 2 illustrates a menu 260 for selecting a narrative audio file (or audio stream) 270 to be assigned to the selected scene. In certain cases, the menu 260 is linked with a file library or a listing of available audio streams that can be assigned to one or more scenes via the API. In various implementations, files are selected from a list of user uploaded and/or default audio files. As noted herein, files can be assigned by heading (also referred to as user look direction) in order to trigger distinct audio playback of files. It is understood that where the term "file" (e.g., audio file) is used in this disclosure, the term "stream" (e.g., audio stream) can be equally applicable.

In some particular examples, the narrative audio file (or audio stream) 270 includes a message introducing content that is available via the interactive audio file selection input 240. That is, the narrative audio file 270 can include an introductory message, prompt or question that requests the user take action in order to trigger playback of a subsequent audio file (or audio stream). In some examples, the narrative audio file 270 includes voice playback such as, "Would you like to hear about local restaurants in your area?", "It seems that you are running; would you like to initiate your 'running' playlist?", "Nod to hear your audio book", or "Would you like to hear a music pin just dropped by Artist X?" That is, in various implementations, the narrative audio file 270 is configured for playback over a brief period, e.g., seconds, and is intended to narrate or introduce a subsequently played file or audio stream. In the example depicted in FIG. 2, the narrative audio file 270 is assigned as the outer ring 275 in a depicted "orb", and using narrative audio file selection input 230, the programmer can select either the outer ring 275 of the orb or the narrative audio file selection input button 230 to assign a narrative audio file or edit an assigned narrative audio file. It is understood that the depicted example of an orb is merely one of a variety of narrative audio file 270 and interactive audio file 280 selection options that may be presented to the programmer according to the implementations herein. For example, other, or additional two-dimensional or three-dimensional shapes can be used to depict assigned file inputs, as well as lists, graphical depictions, charts, etc.

Figure 3:
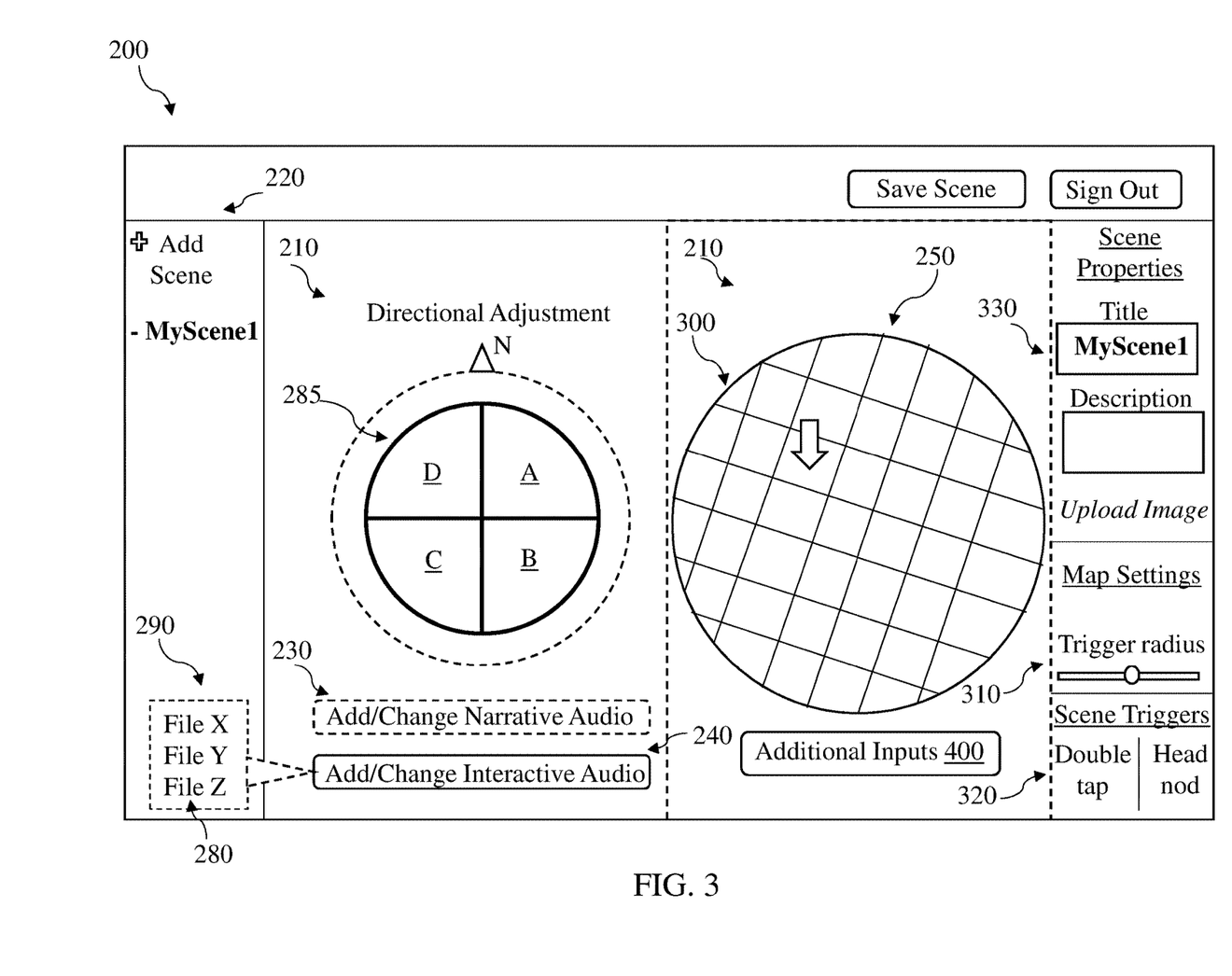
FIG. 3 shows the example interface of FIG. 2, further depicting sub-inputs to the API according to various implementations.

FIG. 3 illustrates the example interface 200 after the narrative audio file 270 has been selected and assigned, or edited and assigned (e.g., via menu 260). After selecting the narrative audio file 270 from menu 260, the interactive audio file selection input 240 enables the programmer to select an interactive audio file (or audio stream) 280 for the "orb" from an additional menu 290. In various implementations, as noted herein, the interactive audio file 280 is assigned for playback following playback of the narrative audio file 270. In various implementations, the interactive audio file 280 is related to the narrative audio file 270, such that selecting a narrative audio file 270 enables only a limited number of interactive audio files 280 for the interactive audio file selection input 240. Examples of interactive audio files can include reviews of local restaurants (e.g., from a person followed on social media, or a celebrity), a playlist of music related to a particular detected activity (e.g., running, commuting, working), an audio book or podcast (e.g., related to the time of day, or a detected state of activity and/or location for the user), a recently released song from an artist known to be of interest to the user and/or a breaking news segment.

In certain cases, the narrative audio file 270 and/or the interactive audio file 280 includes a spatialized audio file configured for playback (which in some examples is binaural). In these cases, the spatialized audio file is configured for output at a spatially rendered audio location, or multiple spatially rendered audio locations, relative to the user 110 (FIG. 1). For example, the spatialized audio file can be configured for playback at one or more spatially rendered audio locations relative to the user's look direction (e.g., as detected by sensors on the audio device 120 and/or smart device 130), or relative to a physical location proximate the user 110 (FIG. 1). In other cases, the narrative audio file 270 and/or the interactive audio file 280 includes a monaural audio file, a stereo audio file, or a multichannel audio file.

According to some implementations, the augmented audio application 150 (FIG. 1) can provide information to the API about the capabilities of the audio device 120, and tailor the selection options for the narrative audio file 270 and/or the interactive audio file 280 accordingly. That is, where the augmented audio application 150 detects that the audio device 120 is a head or shoulder-worn speaker system that can benefit from binaural playback, the augmented audio application 150 can filter options in the menus 260, 290 to include spatialized audio files. In other cases, where the augmented audio application 150 detects that the audio device 120 is a portable speaker system that may not benefit from binaural playback, the augmented audio application 150 can filter options in the menus 260, 290 to exclude spatialized audio files, or prioritize monaural audio files, stereo audio files, or a multichannel audio files.

In particular cases, as shown in FIG. 3, the interactive audio file selection input 240 can include a plurality of interactive audio file selection sub-inputs A, B, C, etc. for rendering playback based upon an orientation of the user 110 of audio device 120 (FIG. 1). That is, the augmented audio application 150 can be configured to play back distinct interactive audio files at the audio device 120 based upon the orientation of the user 110 relative to the location of the interactive audio files. In certain cases, the orientation of the user 110 is determined based upon a look direction of the user 110 while wearing the audio device 120 (e.g., based upon sensor data such as inertial measurement unit (IMU) data, optical sensor data, etc.). In this sense, the interactive audio files can be assigned based upon the user orientation relative to location, which can include the look direction of the user 110 while at (or proximate to) the location, and/or the user's direction of approach relative to that location. The programmer can assign distinct sub-inputs based upon an orientation of the user 110 at a given location. In various implementations, the orientation assignments can be made using a wheel or other degree-based adjustment mechanism, for example, to allow the programmer to assign distinct sub-inputs to two or more orientations. For example, with relative north (N) as a reference point, the programmer can assign distinct sub-inputs (interactive audio files 280) to orientations defined by degrees from N.

In a particular example, a first sub-input A is assigned to degrees 1-90 (in the clockwise direction), a second sub-input B is assigned to a degrees 91-180, a third sub-input C is assigned to degrees 181-270, and a fourth sub-input D is assigned to degrees 271-360. As depicted in the orb example in FIGS. 2 and 3, the interactive audio file selection input 240 (e.g., including sub-inputs A, B, C) can be assigned by activating (e.g., clicking, highlighting or otherwise selecting) the inner ring 285 of the orb. It is understood that this interactive audio file selection input 240 can be used to assign sub-inputs related to the user's look direction while at the location, as well as the direction from which the user 110 approaches the location. In this sense, the same sub-input (e.g., interactive audio file selection input 240A, assigned to degrees 1-90) can control playback for the user 110 while standing at a location and looking in a particular direction (e.g., between degrees 1-90), as well as when the user 110 approaches the location from that direction (e.g., between degrees 1-90).

In various implementations, the orientation of the orb (or other file input selection mechanism) can be altered (e.g., rotated) to change the orientation of N relative to the input(s). In certain examples, the programmer can click, select or otherwise grab and drag the N, corresponding arrow or the inner ring 285 or outer ring 275 to change the orientation of one or more input(s) with respect to N. It is understood that changes to the orientation of N in one portion of the interface can be reflected in additional relevant areas of the interface, e.g., in the location selection input.

As noted herein, FIGS. 2 and 3 also show an example location selection input 250, which enables the programmer to assign the narrative audio file selection input 230 (and related interactive audio file selection input 240) to a geographic location (e.g., a specific GPS location) and/or to a location relative to the user (e.g., a relative direction with respect to the user, such as a point north, west, etc. of the user). In various implementations, the user heading is determined based upon the orientation of the audio device 120 when the augmented audio application 150 is initiated. In certain cases, this user heading is considered "relative North" for the purposes of determining relative location and assignment of orientation-specific audio. The example location selection input 250 depicted includes a map display 300, that is adjustable to permit selection of one or more locations on a map for assigning the narrative audio file selection input 230 and related interactive audio file selection input 240 (example selection shown by arrow). The map display 300 is merely one example display format for the location selection input 250, which can alternatively, or additionally, include coordinate entries, relative position/direction designations, landmark-based location identification, text-based entries, etc. As noted above, changes in the orientation of file selection inputs relative to N can be reflected in the location selection input 250, e.g., such that map display 300 rotates, tilts or otherwise moves (e.g., shifts) to correspond with a change in the orientation of N in the file selection input section of the interface 200.

Additional implementations of the interface 200 include additional inputs, such as a radius selection input 310 for defining a radius around a location corresponding with the location selection input 250. The radius selection input 310 can define the radius around a particular location at which the user will experience a prompt (e.g., playback a narrative audio file 270) associated with augmented audio playback (e.g., an interactive audio file 280). In certain implementations, the radius selection input 310 includes a slider or other actuatable control for adjusting the radius around a particular location for triggering the augmented audio playback.

The interface 200 can also include an actuation trigger selection input 320 for defining an actuation mechanism to initiate rendering of the scene in the augmented audio environment. This actuation trigger selection input 320 allows the programmer to designate a type of trigger for actuating playback of the narrative audio file 270 and/or the interactive audio file 280. For example, actuation triggers can include tactile cues such as tapping or double-tapping a capacitive touch interface on the audio device 120 (FIG. 1), gesture-based cues such as nodding while wearing the audio device 120, or voice command cues detectable by microphone(s) at the audio device 120 or smart device 130.

The interface 200 can further include identification inputs 330, which allow the programmer to name the scene, provide a description, and/or upload an image to designate to the scene.

Further implementations of the interface 200 can include additional inputs 350, which can be used in addition to, or alternatively to, the location selection input 250 shown and described with reference to FIGS. 2 and 3 to trigger rendering of a scene in an augmented audio environment. In some cases, the additional inputs 350 can be related to location-independent conditions (e.g., time of day, weather, speed/acceleration, etc.), while in other cases, the additional inputs 350 can be related to partially location-dependent conditions (e.g., demographic data in a geographic location).

Figure 4:
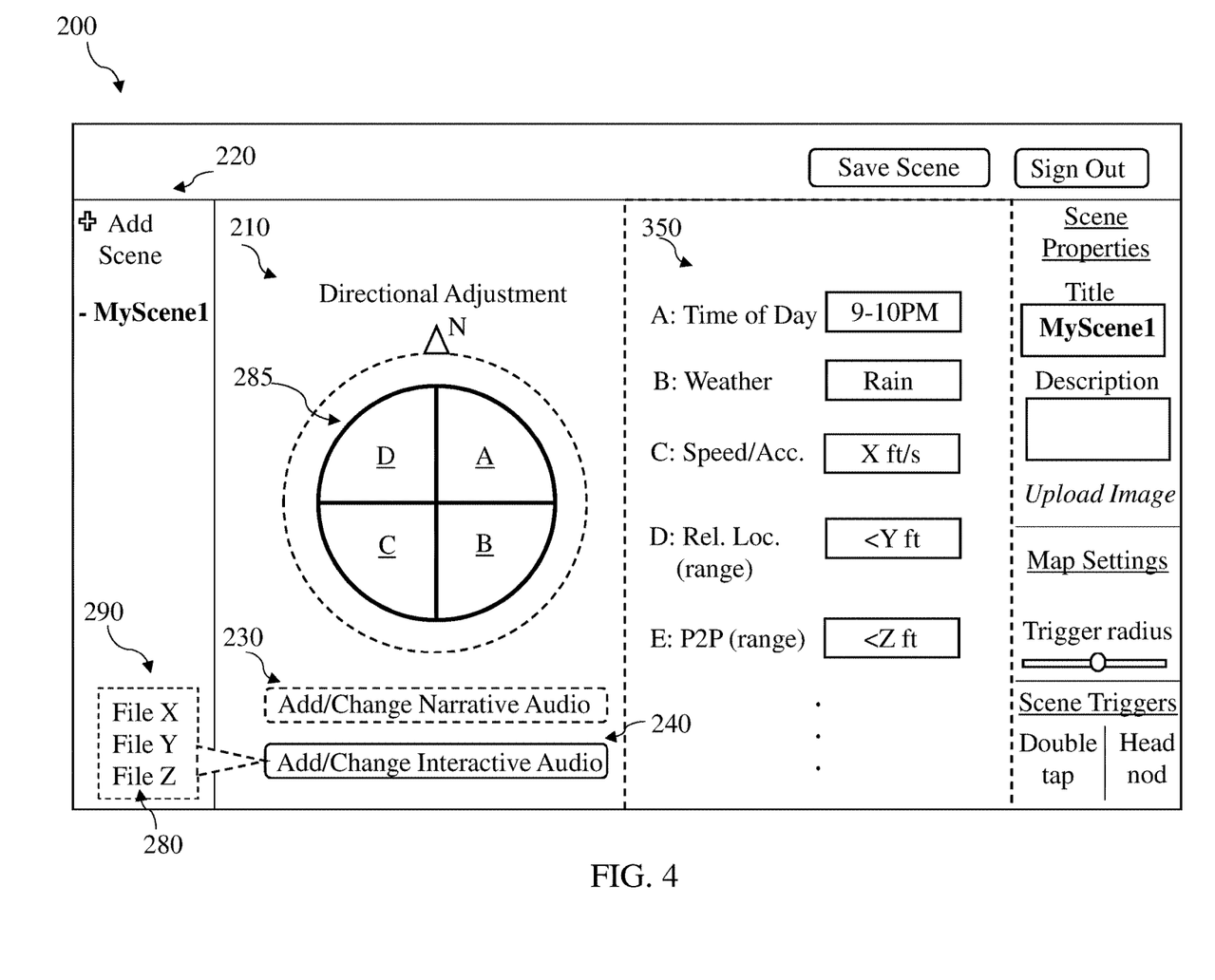
FIG. 4 shows the example interface of FIG. 2, depicting additional inputs to the API according to various implementations.

In certain aspects, the triggers (or conditions) can be used in addition to the location trigger, or alternatively to the location trigger, to initiate playback of one or more audio files (e.g., narrative audio file and interactive audio file). For example, a button or other actuation mechanism for adding additional inputs 350 is illustrated in the interface 200 in FIGS. 2 and 3. In certain cases, the programmer can actuate the button or other mechanism to enter additional inputs 350, which may be positioned in place of the location selection input 250 in interface 200, or in an additional interface, such as a pop-up interface or a standalone sub-interface that appears after actuation of the "additional inputs 350" button (or other mechanism). One example where location selection input 250 is replaced with additional inputs 350 is illustrated in FIG. 4. In this case, additional inputs 350 to the API can include one or more of the following sub-inputs, only some of which are illustrated in FIG. 4:

350A: Time(s) of Day. This input allows the programmer to define time(s) of the day for actuating playback of the audio files, e.g., between particular hours in the evening or the morning.

350B: Weather Condition(s). This input allows the programmer to define weather condition(s) that may actuate playback of the audio files, e.g., precipitation, cloudiness, etc.

350C: Speed/Acceleration threshold. This input allows the programmer to define movement thresholds that may actuate playback of the audio files, e.g., sustained higher speed motion could indicate running, riding a bicycle, or otherwise performing an exercise.

350D: Relative Location to other(s), in terms of range for actuation. This input allows the programmer to define a range relative to other users (e.g., of the augmented audio application 150) for actuating playback of the audio files, or sharing social aspects of the application via audio.

350E: P2P Proximity range for actuation. This input allows the programmer to define a range relative to other users (e.g., of the augmented audio application 150) for actuating peer-to-peer communication and/or file sharing.

350F: Celestial Event(s) condition. This input allows the programmer to define particular types of celestial events for actuating playback of audio files, e.g., meteor showers, full moons, etc.

350G: Current Event(s) condition. This input allows the programmer to define particular types of news events, news sources, celebrities, products and/or companies that can trigger playback of audio files, e.g., a breaking news story or the release of a new song by an artist that the user 110 follows on a social media platform.

350H: Application execution data for polling or voting. This input allows the programmer to define types of feedback that the user may be prompted to provide, e.g., about a product (such as in the case of polling), or in a social game or political forum (e.g., such as in the case of voting).

350I: Location patterns for the user. This input allows the programmer to define how many times a user's detected location must intersect with a previously defined location pattern (e.g., a commuting route, or a regular bicycling route) in order to trigger audio playback.

350J: Location patterns for a group of users. This input allows the programmer to define which frequently traveled location(s) will trigger audio playback for the user, e.g., based upon a popularity of a location (e.g., X number of users of the augmented audio application 150 pass through this location in a period), or the presence of the location on a popular travel route (e.g., a walking tour of a city).

350K: Location type. This input allows the programmer to define types of locations that will trigger playback of the audio files, e.g., greenspaces will trigger playback of meditation-type music, while densely populated urban locations will trigger playback of up-tempo music.

350L: Demographic condition in the geographic location. This input allows the programmer to define audio playback in areas having distinct demographic trends or characteristics. For example, the programmer can assign audio files for playback when the user enters a neighborhood having a known demographic characteristic, e.g., an audio file about Italian-American immigration played in response to detecting that the user is located proximate a neighborhood with a high percentage of Italian or Italian-American residents.

350M: Social media data indicating a social media connection with a user that dropped an audio pin at the location. This input allows the programmer to define a level of connectedness between the user and the social media connection (e.g., first level, second level, etc.), and may also allow the programmer to define a type of audio pin that can be played (e.g., music, or information about sporting events).

350N: Sound management features. This input allows the programmer to define sound management features for playback of one or more audio files, e.g., the narrative audio file and/or interactive audio file. In some cases, the programmer can select a sound management feature such as active noise reduction (ANR) or awareness level (e.g., how much ambient sound is played through to the user) for one or more audio files. In these cases, the programmer can select a sound management feature (e.g., ANR, awareness levels 1-5) and assign that sound management feature to playback of audio file(s), such that when the audio device 120 enables that sound management feature, the file(s) are played back with that feature engaged.

Any of the above-noted sub-inputs can be presented to the programmer in any format described herein, e.g., fillable text, slider, drop-down menu, pre-selects, etc. These additional sub-inputs 350A-350N are described in further detail in terms of the user experience in the related U.S. Patent Application, entitled "Augmented Reality Audio Playback Control", herein incorporated by reference in its entirety.

As noted herein, a programmer can use the scene selection menu 220 to assign additional inputs 210 to additional scenes in the augmented audio environment. In various implementations, the programmer can interact with the interface 200 to assign inputs 210 to a plurality of scenes in an augmented audio environment, e.g., based upon one or more of geographic location, type of location, user identification characteristics, user travel patterns, proximity to other users, density of users in an area, type of audio device, etc.

In any case, the augmented audio application 150 (FIG. 1) is configured to render the scene in the augmented audio environment based upon the set of inputs 210, for example, in response to user actuation at the audio device 120. In particular implementations, as shown in the flow diagram in FIG. 5, the augmented audio application 150 is configured to generate an augmented audio environment by rendering one or more scenes based upon the inputs 210. In particular implementations, the API allows an API calling component to perform the following processes:

Decision 400: detect user proximity to a location associated with the location selection input 250. In various implementations, location detection can be performed using data from global positioning systems, Wi-Fi and/or other network location systems, peer-to-peer location-based systems, etc., which may be located at the audio device 120 and/or the smart device 130. Proximity to the location can be defined based upon the radius selection input 310, entered by the programmer (FIG. 2, FIG. 3).

Process 410: In response to detecting that the audio device 120 is proximate a location associated with the location selection input 250 (Yes to Decision 400), the augmented audio application 150 is configured to render (e.g., play) the narrative audio file 270 entered via the corresponding input 230 (FIG. 2). In various implementations, the narrative audio file 270 includes a prompt to play an interactive audio file 280, as described herein.

Figure 5:
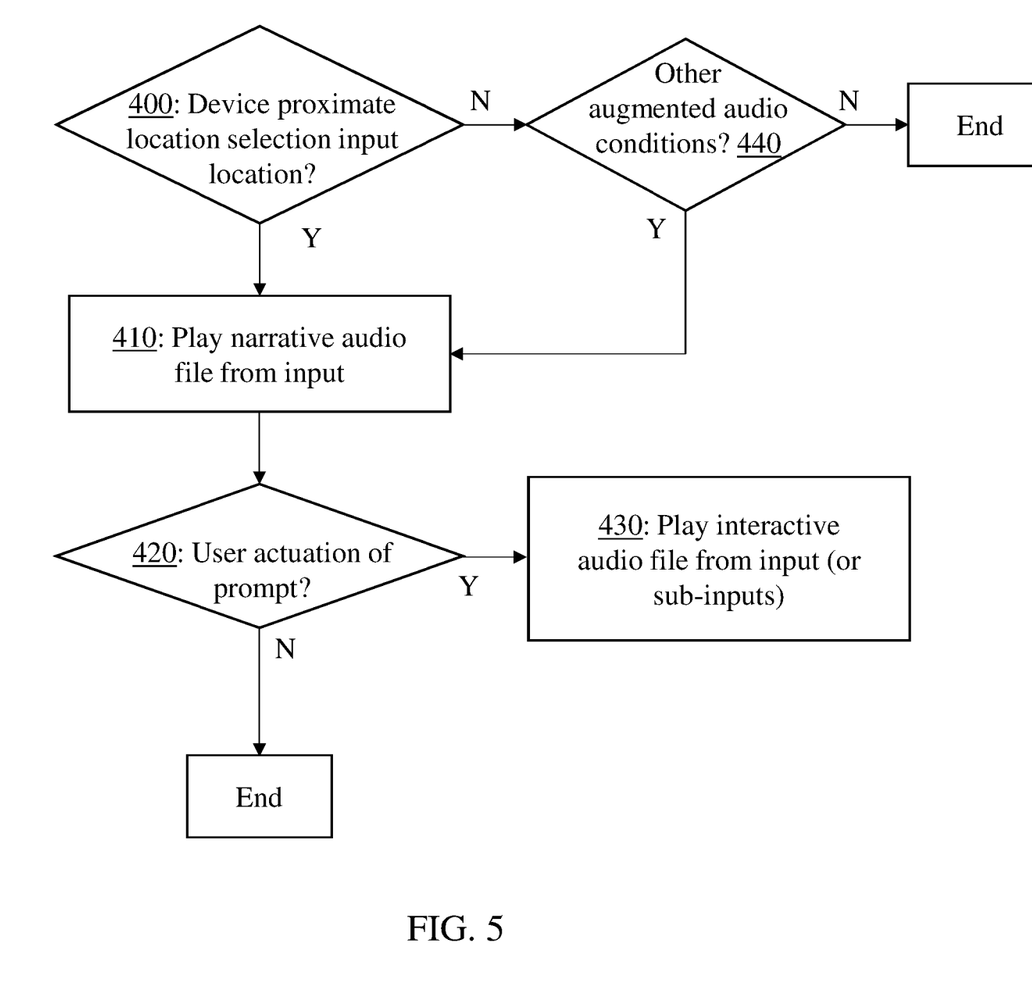
FIG. 5 is a flow diagram illustrating processes performed by the augmented audio application shown in FIG. 1.

Decision 420: Does user 110 actuate or otherwise respond positively to the prompt? In various implementations, the prompt asks the user to take some affirmative action, e.g., double-tap a capacitive touch interface at the audio device 120, nod while wearing the audio device 120, actuate a tactile command on the smart device 130 and/or provide a voice response that is detectable at the audio device 120 and/or smart device 130.

Process 430: In response to user actuation of the prompt (Yes to decision 420), the augmented audio application 150 is configured to render (e.g., play) the interactive audio file 280 at the audio device 120. In certain cases, the interactive audio file 280 is rendered only in response to user actuation of the prompt, e.g., to avoid unwanted playback after listening to the narrative audio file 270.

As noted herein, and illustrated in FIGS. 3 and 4, each of the audio file selection inputs 240 can include a plurality of (e.g., two or more) sub-inputs (A, B, C, D), which can be used for orientation-based playback. In these cases, prior to rendering the interactive audio file 280 at the audio device 120 (process 430), the augmented audio application 150 can further detect an orientation of the user 110 (or, the audio device 120) in response to actuation of the prompt, and render one of the plurality of sub-inputs (A, B, C, D) based upon the detected orientation. In these cases, the user 110 can experience distinct playback while at the same physical location, based upon differences in orientation. In certain cases, orientation can include additional dimensional considerations, for example, elevation, such that sub-inputs A-D can be assigned to a same general physical location based upon differences in elevation, as well as look direction. Additional details and examples related to the user experience in the augmented audio environment are described in the following patent applications, each of which is herein incorporated by reference in its entirety: U.S. patent application Ser. No. 16/267,643 ("Location-Based Personal Audio"); U.S. patent application Ser. No. 16/179,205 ("Spatialized Virtual Personal Assistant"); and U.S. patent application Ser. No. 16/289,940 (entitled "Augmented Reality Audio Playback Control"), filed concurrently herewith on Mar. 1, 2019.

Returning to the top of the flow diagram in FIG. 5, in cases where the device 120 is determined not to be proximate a location associated with the location selection input (No to decision 400), the augmented audio application 150 can still be configured to generate an augmented audio environment according to one or more additional factors or triggers. In these cases, in decision 440, the augmented audio application 150 determines whether one or more additional augmented audio conditions is satisfied, and if so, the process can continue to process 410 as described herein. Satisfaction of one or more augmented audio conditions can be detected with data obtained from one or more applications running on the smart device 130 and/or sensors on the audio device 120 and/or the smart device 130. This data can include one or more of: clock data indicating a current time of day, location type data indicating a type of geographic location proximate the audio device 120, demographic data indicating at least one demographic attribute of the geographic location proximate the audio device 120, weather data indicating a weather condition proximate the audio device 120, speed data indicating a speed at which the audio device 120 is moving, relative location data indicating the audio device 120 is proximate to a plurality of additional audio devices associated with corresponding users executing a common application on the audio device 120 or a paired audio gateway (e.g., at smart device 130), celestial event data indicating a current or impending celestial event, current event data indicating a breaking news story, a new release of a product, or a new release of an artistic work, application execution data for an application executing on the audio device 120 or a paired audio gateway (e.g., at smart device 130), or data indicating proximity to an additional audio device associated with an additional user executing a common application. Additional details of augmented audio conditions and how such conditions can be detected in order to render an augmented audio environment are described in co-pending U.S. patent application Ser. No. 16/289,940 (entitled "Augmented Reality Audio Playback Control"), filed concurrently herewith on Mar. 1, 2019, which is incorporated by reference in its entirety above.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., augmented audio apps) utilizing one or more input mechanisms. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples, the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component). However, the API may be implemented in terms of a specific programming language. An API-calling component can, in one example, call APIs from different providers such as a set of APIs from an OS provider and another set of APIs from a plug-in provider and another set of APIs from another provider (e.g. the provider of a software library) or creator of the another set of APIs.

Figure 6:
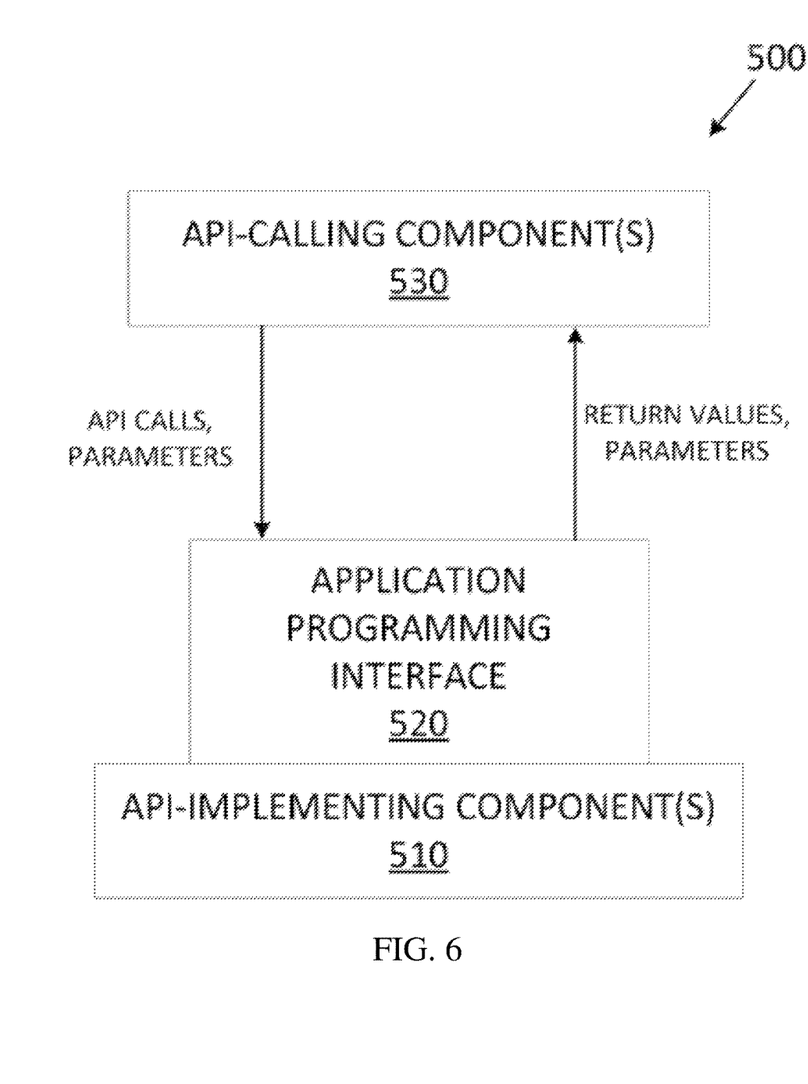
FIG. 6 is a block diagram illustrating an example API architecture used according to various implementations.

FIG. 6 is a block diagram illustrating an example API architecture, which may be used in some implementations. As shown in FIG. 6, the API architecture 500 includes the API-implementing component(s) 510 (e.g., an operating system, a library, a device driver, an API, an application program, software or other module) that implements the API 520. The API 520 specifies one or more functions, methods, classes, objects, protocols, data structures, formats and/or other features of the API-implementing component that may be used by the API-calling component(s) 530. The API 520 can specify at least one calling convention that specifies how a function in the API-implementing component receives parameters from the API-calling component and how the function returns a result to the API-calling component. The API-calling component 530 (e.g., an operating system, a library, a device driver, an API, an application program, software or other module), makes API calls through the API 520 to access and use the features of the API-implementing component 510 that are specified by the API 520. The API-implementing component 510 may return a value through the API 520 to the API-calling component 530 in response to an API call.

The API-implementing component 510 may include additional functions, methods, classes, data structures, and/or other features that are not specified through the API 520 and are not available to the API-calling component 530. The API-calling component 530 may be on the same system as the API-implementing component 510 or may be located remotely and accesses the API-implementing component 510 using the API 520 over a network. While FIG. 6 illustrates a single API-calling component 530 interacting with the API 520, other API-calling components, which may be written in different languages (or the same language) than the API-calling component 530, may use the API 520.

The API-implementing component 510, the API 520, and the API-calling component 530 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 7:
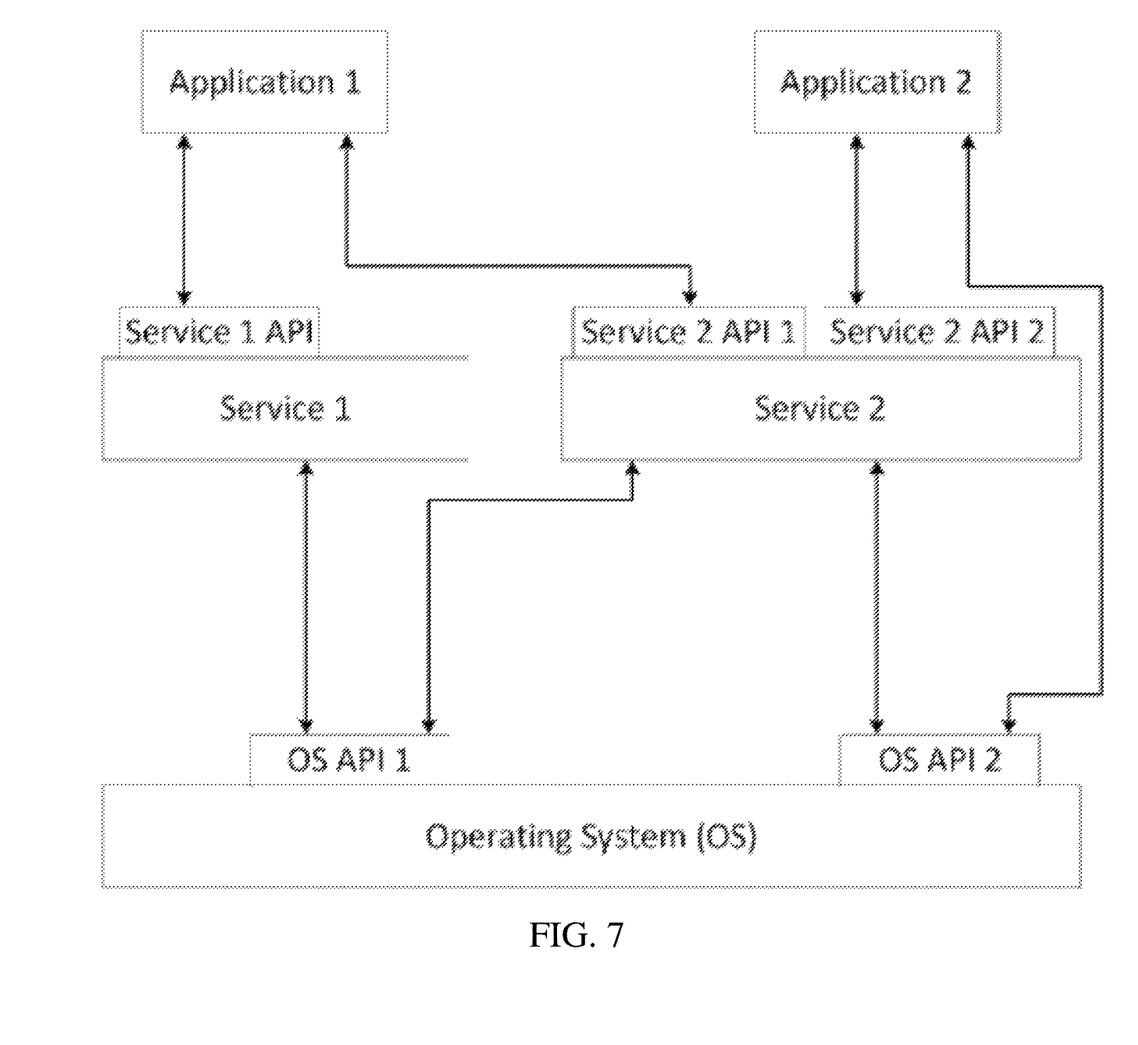
FIG. 7 is a schematic depiction of a software stack used according to various implementations.

In an example software stack shown in FIG. 7, applications can make calls to Services 1 or 2 using several Service APIs and to an Operating System (OS) using several OS APIs. Services 1 and 2 can make calls to OS using several OS APIs. In this example, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computing device for rendering a scene in an augmented audio environment, the computing device comprising:
   a display;
   a processor to execute instructions; and
   a memory coupled with the processor to store the instructions, which when executed by the processor, cause the processor to perform operations to generate a set of inputs to an application programming interface (API) on the display, the set of inputs comprising:
   a narrative audio file selection input; and
   an interactive audio file selection input,
   wherein the scene is rendered based upon the set of inputs in response to user actuation at an audio device.

2. The computing device of claim 1, wherein the API allows an API-calling component to perform the following operations in response to the user actuation at the audio device:
   render, at the audio device, playback of a narrative audio file from the narrative audio file selection input; and
   render, at the audio device, playback of an interactive audio file from the interactive audio file selection input after rendering of the narrative audio file.

3. The computing device of claim 2, wherein the set of inputs further comprises a location selection input, and wherein the narrative audio file is rendered in response to the user actuation while the audio device is in proximity to a location corresponding with the location selection input.

4. The computing device of claim 2, wherein the narrative audio file comprises a prompt to initiate playback of the interactive audio file, and wherein the API-calling component renders playback of the interactive audio file only in response to user actuation of the prompt to initiate playback of the interactive audio file.

5. The computing device of claim 1, wherein the narrative audio file selection input enables a programmer to assign a narrative audio file for describing the scene in the augmented audio environment.

6. The computing device of claim 5, wherein the interactive audio file selection input enables a programmer to assign an interactive audio file for playback following the narrative audio file.

7. The computing device of claim 6, wherein at least one of the narrative audio file or the interactive audio file comprises a spatialized audio file configured for binaural playback, a monaural audio file, a stereo audio file, or a multichannel audio file.

8. The computing device of claim 1, wherein the interactive audio file selection input comprises a plurality of interactive audio file selection sub-inputs for rendering playback based upon an orientation of a user of the audio device.

9. The computing device of claim 8, wherein the orientation of the user is determined based upon a look direction of the user while wearing the audio device.

10. The computing device of claim 1, wherein the instructions cause the processor to further generate an additional set of inputs for rendering an additional scene in the augmented audio environment, the additional set of inputs comprising:
    an additional narrative audio file selection input; and
    an additional interactive audio file selection input,
    wherein the additional scene is rendered based upon the additional set of inputs in response to user actuation at the audio device.

11. A computer-implemented method comprising:
    generating a set of inputs to an application programming interface (API) on a display, the set of inputs comprising:
    a narrative audio file selection input; and
    an interactive audio file selection input; and
    rendering the set of inputs at an audio device to generate an augmented audio environment.

12. The computer-implemented method of claim 11, wherein the scene is rendered based upon the set of inputs in response to user actuation at the audio device.

13. The computer-implemented method of claim 11, wherein the API allows an API-calling component to perform the following operations in response to the user actuation at the audio device:
    render, at the audio device, playback of a narrative audio file from the narrative audio file selection input; and
    render, at the audio device, playback of an interactive audio file from the interactive audio file selection input after rendering of the narrative audio file.

14. The computer-implemented method of claim 13, wherein the set of inputs further comprises a location selection input, and wherein the narrative audio file is rendered in response to the user actuation while the audio device is in proximity to a location corresponding with the location selection input.

15. The computer-implemented method of claim 13, wherein the narrative audio file comprises a prompt to initiate playback of the interactive audio file, and wherein the API-calling component renders playback of the interactive audio file only in response to user actuation of the prompt to initiate playback of the interactive audio file.

16. The computer-implemented method of claim 11, wherein the narrative audio file selection input enables a programmer to assign a narrative audio file for describing the scene in the augmented audio environment.

17. The computer-implemented method of claim 16, wherein the interactive audio file selection input enables a programmer to assign an interactive audio file for playback following the narrative audio file.

18. The computer-implemented method of claim 17, wherein at least one of the narrative audio file or the interactive audio file comprises a spatialized audio file configured for binaural playback, a monaural audio file or a stereo audio file, or a multichannel audio file.

19. The computer-implemented method of claim 11, wherein the interactive audio file selection input comprises a plurality of interactive audio file selection sub-inputs for rendering playback based upon an orientation of a user of the audio device.

20. The computer-implemented method of claim 19, wherein the orientation of the user is determined based upon a look direction of the user while wearing the audio device.

21. The computer-implemented method of claim 11, further comprising generating an additional set of inputs for rendering an additional scene in the augmented audio environment, the additional set of inputs comprising:
an additional narrative audio file selection input; and
an additional interactive audio file selection input,
wherein the additional scene is rendered based upon the additional set of inputs in response to user actuation at the audio device.

22. A computer-implemented method comprising:
generating a set of inputs to an application programming interface (API) on a display, the set of inputs comprising:
an interactive audio file selection input comprising a plurality of interactive audio file selection sub-inputs; and
a location selection input; and
generating an augmented audio environment by rendering at least one of the sub-inputs at an audio device in response to the audio device being in proximity to a location corresponding with the location selection input, and wherein the at least one of the sub-inputs is selected based upon an orientation of a user of the audio device relative to the location.

23. The computer-implemented method of claim 22, wherein generating an augmented audio environment by rendering at least one of the sub-inputs at an audio device is in response to both: (i) the audio device being in proximity to a location corresponding with the location selection input and (ii) user actuation at the audio device.

24. The computer-implemented method of claim 22, wherein the set of inputs further comprises a narrative audio file selection input, and wherein generating the augmented audio environment further comprises rendering a narrative audio file from the narrative audio file selection input at the audio device in response to the audio device being in proximity to the location corresponding with the location selection input, prior to rendering the at least one of the sub-inputs.

* * * * *